US008428611B2

(12) United States Patent
De Pasquale et al.

(10) Patent No.: US 8,428,611 B2
(45) Date of Patent: Apr. 23, 2013

(54) METHOD AND DEVICE FOR CONTROLLING MULTI-PATH CONNECTIONS IN RADIO ACCESS NETWORKS

(75) Inventors: Andrea De Pasquale, Madrid (ES); Ignacio Gonzalez Guijarro, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 590 days.

(21) Appl. No.: 12/633,910

(22) Filed: Dec. 9, 2009

(65) Prior Publication Data

US 2010/0216451 A1  Aug. 26, 2010

(30) Foreign Application Priority Data

Dec. 9, 2008   (ES) .................................. 200803482

(51) Int. Cl.
*H04W 72/00* (2009.01)
(52) U.S. Cl.
USPC ........................................ 455/453; 455/452.2
(58) Field of Classification Search .................. 455/453, 455/452.2
See application file for complete search history.

(56) References Cited

U.S. PATENT DOCUMENTS

| 7,643,426 | B1 * | 1/2010 | Lee et al. ...................... 370/238 |
| 2006/0221909 | A1 | 10/2006 | Farineau et al. |
| 2008/0084819 | A1 * | 4/2008 | Parizhsky et al. ............. 370/230 |
| 2009/0149132 | A1 * | 6/2009 | LeFever et al. ............ 455/67.11 |

OTHER PUBLICATIONS

Liang Ma et al, "A Routing Metric for Load-Balancing in Wireless Mesh Networks", May 21, 2007, pp. 409-414, IEEE 2ST International Conference on Advanced Information Networking and Applications Workshop—Ainaw '07, XP031334717.
Denko M K Ed—Anonymous, "Using Mobile Internet Gateways in Wireless Mesh Networks", Mar. 25, 2008, pp. 1086-1092, 22$^{nd}$ IEEE International Conference on Advanced Information Networking and Applications—AINA 2008, NJ, USA, XP031240756.

* cited by examiner

*Primary Examiner* — Kamran Afshar
*Assistant Examiner* — Omoniyi Obayanju
(74) *Attorney, Agent, or Firm* — B. Aaron Schulman, Esq.; Nicholas Trenkle, Esq.; Stites & Harbison PLLC

(57) ABSTRACT

Method and controller device for controlling a plurality of N transport paths in RANs, wherein a primary path is assigned for each type of traffic to allocate voice or data calls, comprising:
  measuring load of the primary path periodically,
  when a call is incoming, comparing the measured load with a threshold,
    if the load of the primary path is less than or equal to the threshold, allocating the call to the primary path
    otherwise:
      calculating the available bandwidth of each transport path;
      comparing the available bandwidth of the primary path to the available bandwidths of the other transport paths and:
        if the available bandwidth of the primary path is greater than or equal to the available bandwidths of the others, allocating this call to the primary path;
        otherwise, allocating the call to a secondary path chosen from the remaining N−1 transport paths.

15 Claims, 2 Drawing Sheets

METHOD AND DEVICE FOR CONTROLLING MULTI-PATH CONNECTIONS IN RADIO ACCESS NETWORKS

TECHNICAL FIELD OF THE INVENTION

The present invention has its application within the telecommunications sector and, especially, in the industrial area engaged in providing access networks (e.g., UTRAN in UMTS) with elements of cellular infrastructures such as base stations (Nodes-B in UMTS) and controllers (Radio Network Controllers or RNC in UMTS) for wide area cellular telephone networks (i.e., 3G networks).

More particularly, the invention described herein relates to a method and controller device for performing call admission control in UTRAN providing multiple Iub paths (between Nodes-B and the RNC).

BACKGROUND OF THE INVENTION

UTRAN (UMTS Terrestrial Radio Access Network) is a collective term which includes the Radio Network Controller (RNC), the 3G base stations (Nodes-B) and the air interface to the User Equipment (UE). Generally speaking, the base stations and the controller together define a radio access network (RAN); in particular, for networks which support the UMTS standard, the UTRAN is referred to the access network. Node-B handles radio channels, including the multiplexing/demultiplexing of user voice and data information. RNC is responsible for controlling and managing the multiple base stations (Nodes-B) including the utilization of radio network services. In practice, one RNC is capable of controlling a number (more than one) of 3G base stations. For clarity, hereafter, only one Node-B is mentioned.

More particularly, Node-B and RNC are communicated within the UTRAN through determined interfaces.

There are four interfaces connecting the UTRAN internally or externally to other functional entities: Iu, Uu, Iub and Iur. In particular, Iub is an internal interface which constitutes a logical connection between the Node-B and RNC. Physically Iub can be carried over one or more transport paths which connect a pair Node-B-RNC. Transport paths refer here to connections established at network and data link layers (OSI layers 2 and 3). Iub implementations are currently based on either Internet Protocol (IP) technologies or the Asynchronous Transfer Mode (ATM) in combination with the ATM Adaptation Layer Type 2 (AAL2). There are different possibilities for the physical layer, for example: one or several ATM STM-1 (OC-3) links or one STM-4 (OC-12) link, optical fibre, copper line, microwave radio links implementing T1/E1, Ethernet physical layer, Digital Subscriber Loop (DSL) physical layer, etc. Hence, current the transport networks in UTRAN provides multiple Iub paths connecting the RNC with the Node-B, for example, E1 connection plus connection by ADSL are typically used for allocation of data traffic, while voice can be assigned to another (ATM or IP) transport path.

These radio access network scenarios make difficult the traffic management for the RNC and the Node B as they have to choose the best path to transmit the traffic.

Call admission control checks whether there are resources available for the call (with voice or data content) in the radio access network. These resources are not only radio resources but also transport (usually wired) connections between the base station (Node-B) and the base station radio controller (RNC), i.e., Iub resources.

To date, the choice of the path for call admission has always followed a static strategy, which means traffic allocation to a predetermined path independently of the current traffic load in said path. Every kind of traffic, from circuit service (CS) calls, packet service (PS) R99, or HSPA calls, is always carried over the same transport path (the one previously). By doing so, it can happen that a specific type of traffic (for example, voice calls or other delay sensitive real time traffic) is locked into the assigned path which is congested, whilst there are other unassigned available paths that have free capacity.

In order to improve the Iub resource allocation in current 3G access networks a new mechanism which allows optimised selection of transport path is needed and presented as follows.

SUMMARY OF THE INVENTION

The present invention serves to solve the aforesaid problem by allocating each call optimally in accordance to the available capacity in every transport path (including wired or wireless connections) of the (Iub) interface provided between a base station and a controller (Node-B-RNC pair).

The available Iub capacity is checked to provide a quantity that determines the current free transport resource. This checking is based on measurements or can be estimated. The measurements can be done at the transmission interface port of the RNC, checking the amount of Kbps transmitted in every path. Comparing with the maximum available path, the RNC can know what percentage of the path is being used.

In this context, the capacity of the transport network is considered to be the capacity (or bandwidth) of the different transport paths of the Iub interface. It should be appreciated that different standards may have interfaces which are equivalent or the same as the Iub interface. Embodiments of the present invention are applicable to such systems. Available capacity measurement can be carried out based on throughput real time measuring. Additionally, other measures or estimations of the transport network capacity can be used to determine the availability of transport resources.

Having provided more than one Iub paths between one Node-B-RNC pair, the present invention distinguishes, for every kind of (voice or data) traffic, one of the plurality of transport paths to be a primary path and at least one secondary path (if there are N paths, there can be N−1 secondary paths).

The value of N can vary because the number N−1 of secondary paths can depend upon the type of traffic (voice or data) which has to be allocated to any of the multi-path connections.

This invention is also applicable for controlling paths and allocating them to voice and/or data calls on the interface (Iur) provided between a pair of radio network controllers (RNC-RNC).

For each type of traffic (PS, CS, HSPA calls, . . . ), a periodic measuring on throughput of the primary path of the corresponding type of traffic is performed. Note that usually all the calls are assigned to a single primary path by default, as in the Call Admission Control (CAC) known in prior art, but the present invention allows CAC wherein calls are re-assigned to a certain secondary path, which can be chosen according to the type of call, if the primary path is overloaded.

As far as the traffic load (or throughput) measuring is concerned, the measurement is executed by the RNC and the value of the measured indicators can be stored in an internal table in order to be used by the CAC procedure of this invention. Preferably, the RNC measures the load/throughput periodically, almost in real time. The period is preferable to be configurable, preferably with a value which can be fixed according to the type of traffic initially assigned to the primary path, ranging from 5 to 30 seconds. This is by way of example only and other time periods may be used. Alternatively, this measuring period of throughput (or, hereon, available capacity) may vary with time, for example, the period may be shorter during periods of peak demand and longer during other periods.

Throughput of the path is defined as the average rate of successful delivery of calls over said path, considering the delivery over a physical or logical link. The throughput is usually measured in bits per second (bit/s or bps). Throughput is directly related to the traffic load of the path. Hence, measuring an indicator of throughput determines how much loaded the path is in the instant when a call incomes and, in case of overloading in the primary path, triggers the activation of seeking another connection (bearer) from the secondary paths.

After comparing the (measured or estimated) available capacity of every path, a secondary path with higher available capacity than the available capacity of the primary path in the incoming call instant can be selected to accommodate said incoming call. In a preferred embodiment of the invention, the selected path is the one with the highest available capacity in this moment, that is, the new call is allocated to the path less used currently.

The proposed CAC procedure is compatible with the case in which some calls (belonging to a given traffic type) follow the classical static CAC strategy and are rightly allocated to the assigned primary path, while the calls of the rest of traffic types are dynamically allocated to the primary path or to a secondary path taking into account their available bandwidth.

An aspect of the invention refers to a method for controlling multi-path connections in a radio access network of a cellular telephone network (UTRAN in UMTS), having a plurality of N transport paths provided between a pair of access network elements (RNC and Node-B, or RNC and RNC), which comprises the following steps:

measuring (usually at predetermined intervals as explained before) an indicator of load (or of throughput) of a primary path assigned from the N transport paths to allocate at least one type of traffic, for each incoming communication, comparing the measured load of the primary path with a threshold, and:

only when the measured load exceeds the threshold, assigning (or allocating) the incoming communication to a secondary path selected from the remaining N−1 transport paths.

Preferably, if the load of the primary path is higher than the threshold, the method further comprises:

calculating available bandwidth for each of the N transport paths;

comparing the available bandwidth of the primary path with the calculated available bandwidths of the remaining N−1 transport paths and:

if the available bandwidth of the primary path is lower than the available bandwidth of a given one of the other N−1 transport paths, the given other N−1 transport path is chosen as a secondary path and the incoming communication is allocated to said secondary path from the N−1 transport paths.

However, if the available bandwidth of the primary path is greater than or equal to the respective, available bandwidths of all the remaining N−1 transport paths, the call is nevertheless allocated to the primary path.

Conveniently, if the load of the primary path is compared to the threshold and found to be less than or equal to the threshold, the incoming communication is allocated to the primary path.

Another aspect of the invention deals with a RAN device (depending on the standard in question it is referred to as a radio network controller: RNC) which complies control functions of one or more base station (3G base station: Node-B) and comprises traffic allocation means, throughput (or load) measuring means and processing means to implement the method for controlling multi-path connections on Iub or Iur interface as described above.

A last aspect of the invention deals with a computer program comprising program code means which execute the method described before, when loaded into processing means of the radio network controller defined above, The benefits of the present invention are translated into an effective way for traffic congestion control on the UTRAN interface (Iub, Iur) interface and into and optimised use of the paths added to when extending the access network capacity. In addition, the cost of the networks is reduced since the capacity of the transport network is more efficiently used and fewer expansions are needed.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
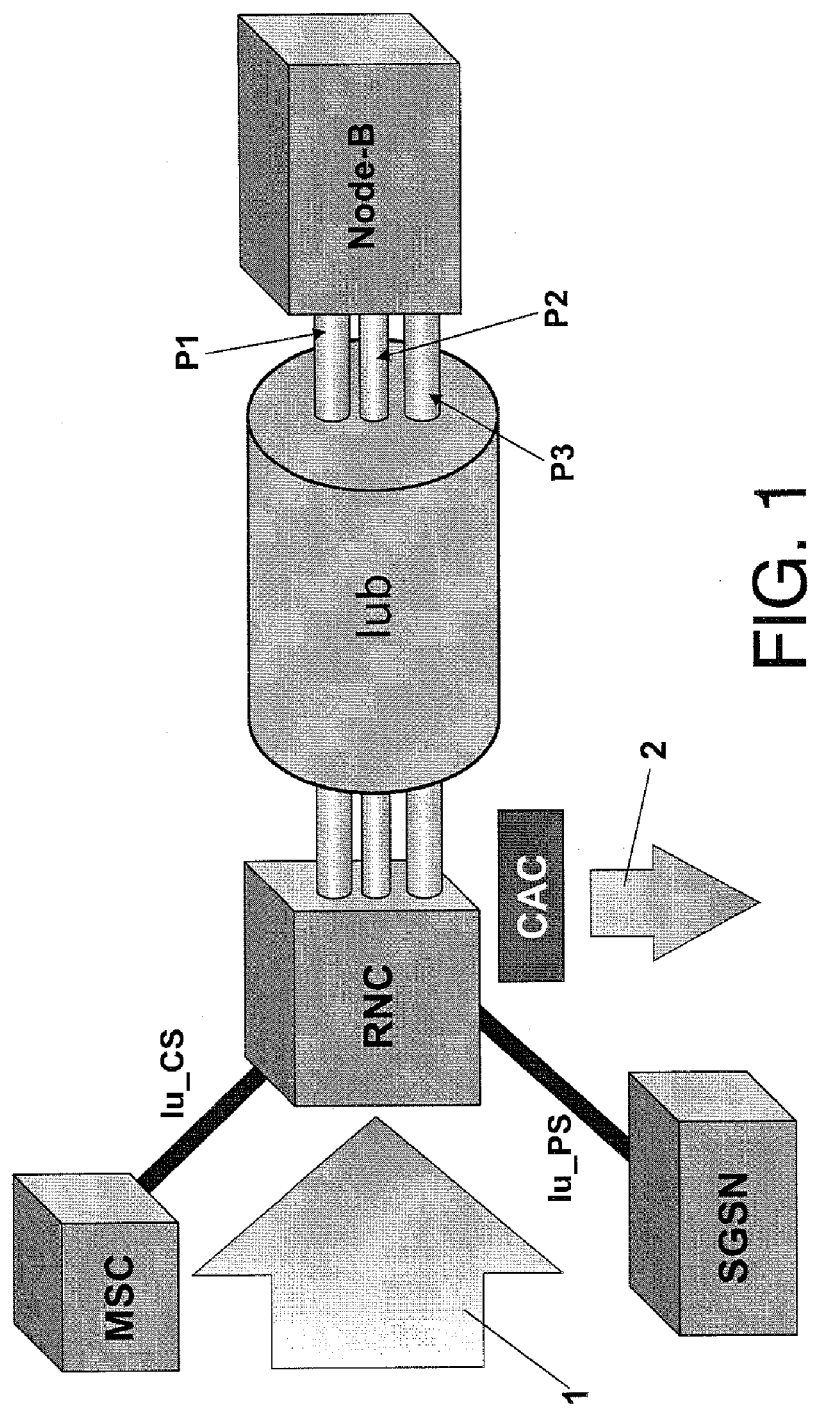
FIG. 1.—It shows a schematic representation of call admission control for multi-path connections between radio access network elements, having the interface bandwidth split into three paths.

FIG. 1 illustrates the UTRAN internal interface (Iub) providing logical connection over a plurality N of paths, in this example N=3, between the base station (Node-B) and the controller (RNC). When data or voice calls arrived at the controller (RNC), for instance, coming from a Serving GPRS Supporting Node or a Mobile Switching Centre through respective PS and CS interfaces (Iu_PS, Iu_CS), a Call Admission Control is activated in the controller (RNC).

According to a preferred embodiment of the invention, among the Iub multiple paths, a primary path (P1) is distinguished from a second path (P2) and a third path (P3). If traffic load of the primary path (P1) is high, greater than or equal to an Activation Threshold, available bandwidths of the second path (P2) and the third path (P3) are also checked, so that the Call Admission Control (CAC) functional entity of the radio network controller (RNC) can select the path with more available bandwidth to allocate the incoming call. Only if none of the paths (P1, P2, P3) has available bandwidth enough at this moment, the call is rejected.

Figure 2:
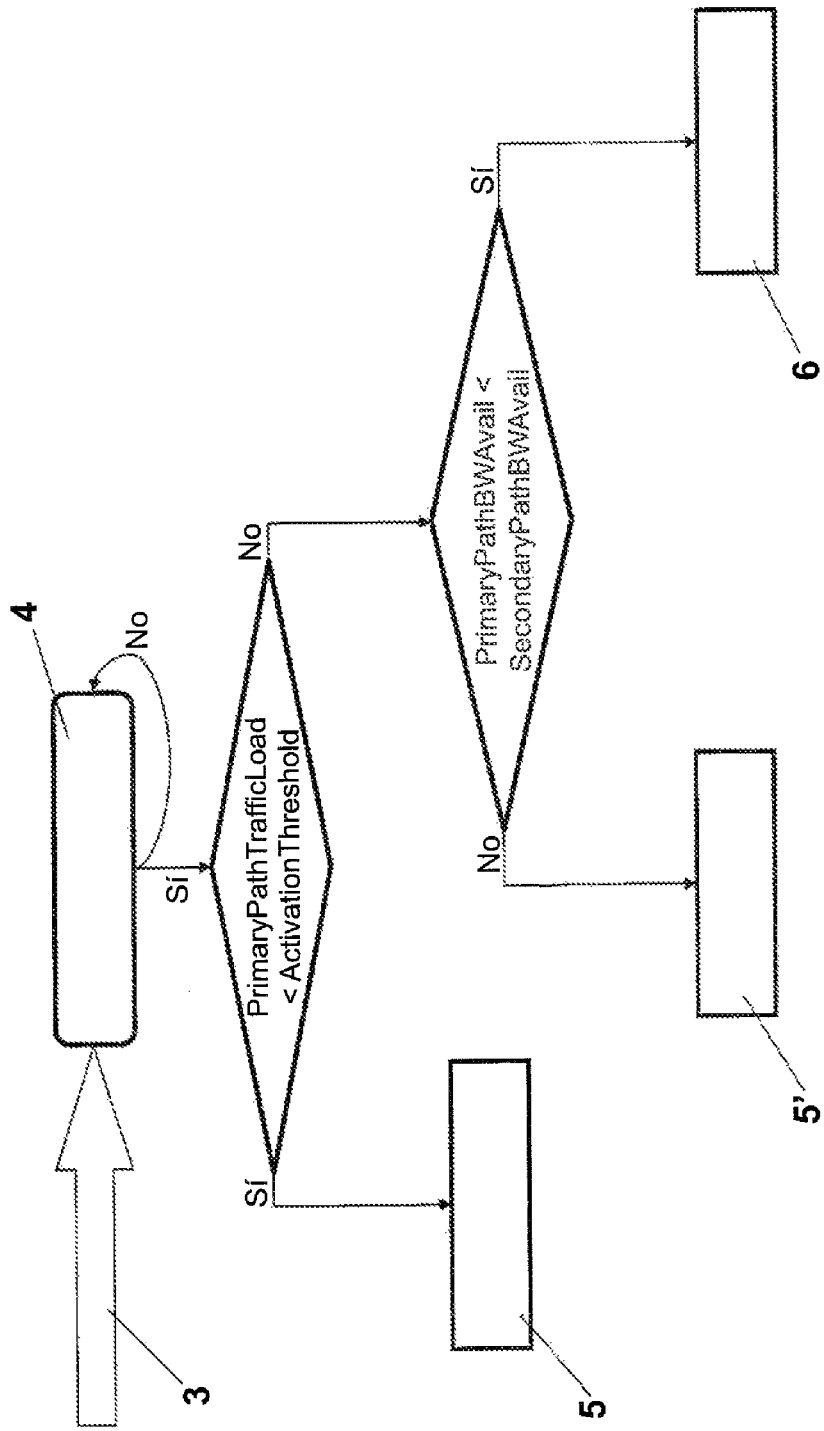
FIG. 2.—It shows a flow diagram of the call admission control method run in the RNC, according to a preferred embodiment of the invention, being the number of available paths equal to two, one primary path and one secondary path.

FIG. 2 shows a flow chart with a preferred implementation of the CAC procedure carried out in the RNC, and for example, illustrating the case of two paths, N=2. Basically, when a new call arrives (3) to the RNC, the CAC checks whether the present feature for controlling multi-path connections is activated, by checking a parameter (4) "balanced allocation multiple path activation" configured in the RNC. If the feature is activated, then there is also configured an "activation threshold", that is, a percentage of the bandwidth used in the primary path which triggers the checking of the optimum path to be used. Let's say for example, that the "activation threshold" is 60%, which means that when there is a new call and the bandwidth of the primary path is less than 60%, the call is directly allocated to that path as the load is not very high. But in case this threshold is exceeded, then there will be a comparison between the different paths and the least used one is chosen. That is, in the example, the available bandwidths of the primary and secondary paths are compared and the one with the lowest load is allocated to the incoming call.

In pseudo code for N=2:

```
At new call, there is a call admission control:
    If "balanced allocation multiple path activation" is activated then
        If PrimaryPathTrafficLoad < ActivationThreshold then
            Allocate the call to the Primary Path (5)
        Else If PrimaryPathBWAvailable > SecondaryPathBWAvailable then
            Allocate the call to the Primary Path (5')
        Else
            Allocate the call to the Secondary Path (6)
```

Embodiments of the present invention may be implemented in software and/or hardware.

Embodiments of the present invention have been described as being carried out in the RNC. In alternative embodiments of the present invention, a separate entity may be provided to carry out the call admission control function proposed before. This entity may be solely responsible for this function or may alternatively provide additional functions.

In preferred embodiments of the present invention, the described call admission control function is provided in the radio access network. However, in alternative embodiments of the present invention, this function may for example be provided in the core network.

Embodiments of the present invention have been described in relation to the UMTS standard. However, it should be appreciated that embodiments of the present invention can be applied to any other suitable standard not limited to 3G standards (beyond 3G technologies, e.g., HSDPA, LTE, WiMAX, etc.)

The terms in which this specification has been worded are always to be taken in the broadest sense and not restrictively.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. Method for controlling multi-path connections in radio access networks of cellular telephone networks, the method comprising:
   measuring an indicator of load of a primary path among a plurality of N transport paths between a pair of access network elements to which traffic of different types is allocated such that a respective primary path is assigned from the N transport paths for each type of traffic, for each incoming communication,
   comparing the measured load of the primary path with a threshold, and only when the measured load exceeds the threshold, assigning the incoming communication to a secondary path selected from the remaining N−1 transport paths, wherein the step of assigning the incoming communication to a secondary path comprises, if the load of the primary path is higher than the threshold: calculating available bandwidth for each of the N transport paths, comparing the available bandwidth of the primary path to the calculated available bandwidths of the remaining N−1 transport paths, if the available bandwidth of the primary path is lower than the available bandwidth of a given one of the remaining N−1 transport paths, selecting the given other N−1 transport path as a secondary path and assigning the incoming communication to said secondary path.

2. Method according to claim 1, further comprising: if the available bandwidth of the primary path is greater than or equal to the available bandwidths of all the N−1 transport paths, assigning the incoming communication to the primary path.

3. Method according to claim 1, further comprising:
   if the load of the primary path is less than or equal to the threshold, assigning the incoming communication to the primary path.

4. Method according to claim 1, wherein the step of measuring the indicator of load of the primary path is performed at predetermined intervals which are configurable.

5. Method according to claim 4, wherein the intervals between measurements of the indicator of load are dependent on the type of traffic assigned to the primary path.

6. Method according to claim 4, wherein the predetermined intervals between measurements of the indicator of load range between 5 seconds and 30 seconds.

7. Method according to claim 1, wherein the chosen secondary path is the transport path with the highest available bandwidth of all the N transport paths.

8. Method according to claim 1, wherein a single primary path is assigned to allocate all types of traffic.

9. Method according to claim 1, wherein the primary path is assigned in accordance to the type of traffic.

10. Method according to claim 1, wherein the threshold for comparison with the indicator of load of the primary path is dependent on the type of traffic assigned to the primary path.

11. Method according to claim 1, wherein the N transport paths are provided between a radio network controller (RNC) with a base station (Node-B) on an Iub interface.

12. Method according to claim 1, wherein the N transport paths are provided between a pair of radio network controllers on an Iur interface.

13. Radio network controller (RNC) comprising processing means configured to implement the method for controlling multi-path connections as set out in any previous claim 1.

14. Radio network controller (RNC) according to claim 13, further comprising data storage means for storing measurements of load of the N transport paths connecting the radio network controller (RNC) with a base station (Node-B).

15. Radio network controller (RNC) according to claim 13, further comprising data storage means for storing measurements of load of the N transport paths connecting the radio network controller (RNC) with another radio network controller.

* * * * *